Jan. 2, 1934.  P. C. GANNON  1,941,549

VALVE FOR TOILET TANKS

Filed March 7, 1931

INVENTOR
Paul C. Gannon
by his attorneys
Byrnes, Stebbins, Parmelee & Blenko

Patented Jan. 2, 1934

1,941,549

UNITED STATES PATENT OFFICE 1,941,549

VALVE FOR TOILET TANKS

Paul C. Gannon, Pittsburgh, Pa.

Application March 7, 1931. Serial No. 520,869

1 Claim. (Cl. 4—56)

My invention relates to a novel form of tank ball or float valve for controlling the flow of water from toilet tanks.

It has been widely recognized heretofore that the type of tank ball now universally used in toilet tanks is defective for a number of reasons. The principal reason is that the ball, which has a mushroom shaped upper portion and a hemispherical lower portion, is found to be distorted after a short period of use, so that it no longer accurately fits the valve seat, with the result that water continually runs from the tank, creating undesirable noise and wasting water.

I am also aware that numerous attempts have been made heretofore to remedy the defects characterizing the type of ball now employed. It has been suggested to reinforce the interior of the ball, both by means of wire frames and reinforcing ribs or corrugations. None of these expedients has been found to be a practical solution for the difficulty encountered with the usual type of balls, and it is the principal object of this invention to provide a tank ball which will satisfactorily perform its functions without interruption for a long period of time and, at the same time, not be subject to the objectionable features characterizing the various expedients heretofore suggested for preventing distortion or caving in of the tank ball under the stress of continued seating on the valve seat and the suction or pressure of the water.

In accordance with my invention, I employ a tank ball consisting of a self-sustaining member adapted, when in operative position, to press a sealing layer against the valve seat. The invention may take several forms. Several of these are described hereinbelow. The invention, however, is not limited to any specific form, since it may be practiced in any of the forms disclosed, as well as in still other forms not shown.

For a complete understanding of the invention, reference is made to the accompanying drawing, in which Figure 1 is a sectional view through one form of tank ball made according to the invention;

Figure 1:
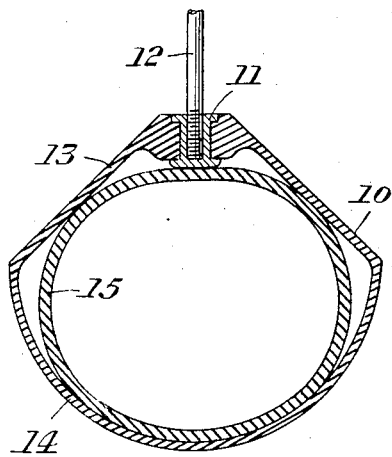

Referring in detail to the drawing, and in particular to Figure 1, one form of the invention comprises a tank ball 10 of rubber or other resilient material of the usual shape. A threaded nipple 11 is seated in the upper end of the ball for receiving the end of an actuating rod 12. As is obvious from Figure 1, the usual shape of ball includes an upper mushroom shaped portion 13 and a lower hemispherically shaped portion 14 adapted to rest on a valve seat.

An air-tight inflated rubber ball 15 is positioned within the ball 10. As shown in Figure 1, the ball 15 is slightly compressed to fit within the ball 10. The ball 15 may be incorporated in the ball 10 in the process of manufacture of the latter, or may be inserted through a small hole cut in the bottom of the ball 10. The insertion of the ball 15 may be accomplished by stretching the wall of the ball 10 to surround the ball 15.

It will be apparent from an inspection of Figure 1 that the ball 15 serves to maintain the walls of the ball 10 in normal position. The ball 15 engages the inner surface of the walls of the ball 10 throughout a substantial portion of the area thereof, and provides a support for said portions of the wall of the ball 10 against distortion or caving in, resulting from engagement with the valve seat or the pressure or suction of the water. The ball 15 also tends to support the bottom portion 14 of the ball 10 against elongation, due to suction. This results from the tendency of the ball 15 to expand the ball 10 laterally. The ball 15 may be solid, as well as hollow, and rigid, as well as compressible.

Figure 2:
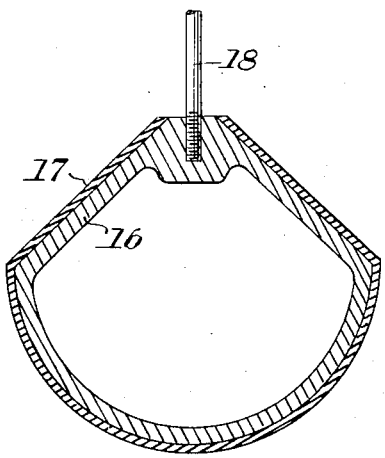
Figure 2 is a similar view of a modified form of ball.

Another form of the invention is illustrated in Figure 2. According to this form of the invention, I provide a rigid liner 16 for a tank ball and apply thereto a layer 17 of soft compressible rubber, such as pure para rubber, for serving as a seal between the rigid liner 16 and the valve seat. An actuating rod 18 may be threaded directly into the rigid liner 16 or into a nipple (not shown) inserted therein. The liner 16 is preferably formed from hard rubber and the latter may be partially vulcanized before the outer layer 17 is applied thereto. By subsequently completing the vulcanization of the liner 16 and that of the outer layer 17 simultaneously, a bond between the liner and the outer layer is effected, which results in a practically one-piece ball. The liner may also be of bakelite or the like.

The liner 16 of hard rubber is, of course, sufficiently strong to withstand the water pressure and the tendency to dent or cave in the ball, as a result of frequent opening and closing of the valve. At the same time, the outer layer 17 is sufficiently compressible to afford a tight seal with the valve seat when in engagement therewith. All distortion of the ball is thus prevented and the defects of the type of ball at present in use are entirely overcome. Since the effective portion of the layer 17 is only that part engaged by the valve seat, the remaining portion may be omitted. Thus the layer 17 may be replaced by a sealing zone or band of soft rubber positioned on the liner 16 so as to engage and seal the valve seat. The liner 16, instead of being continuous, may be perforated or may take the form of an open ribbed frame.

Figure 3:
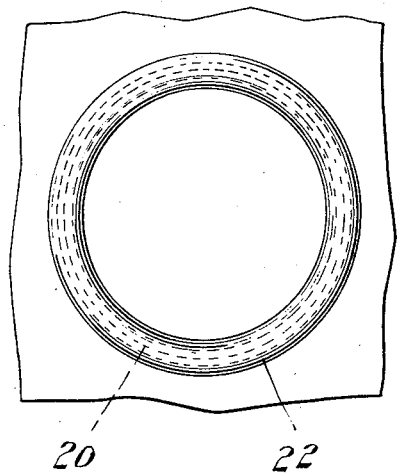
Figure 3 is a top plan view of a valve seat adapted for cooperation with still another type of tank ball.
Figure 4:
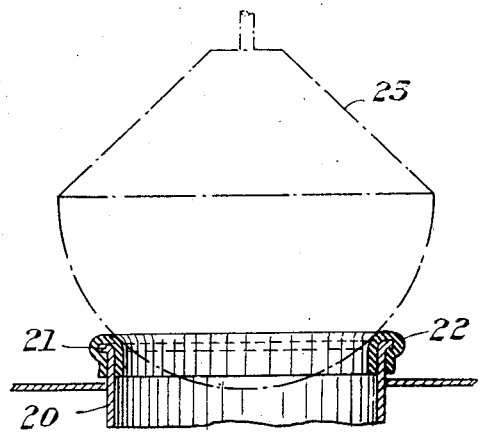
Figure 4 is a transverse sectional view of Figure 3, showing the ball in position on the seat, in chain lines.

Referring now to Figures 3 and 4, a still further form of the invention is disclosed therein. In this form, a tank valve seat 20 has its upper end flanged outwardly at 21. A sealing ring or gasket 22 is applied to the flanged upper end of the seat 20 for receiving a rigid ball, indicated in dotted lines at 23. The ball indicated at 23 may be similar to the liner 16 shown in Figure 2, except that it will be of sufficient size to properly close the valve seat 20. Since the ball 23 is rigid, it is not subject to the objections to a hollow compressible ball, which have been experienced in the past. The rigid ball cannot be distorted or elongated by pressure or suction and has a very long life, in spite of frequent operation of the valve.

The sealing ring 21, at the same time, provides a perfect seal between the ball 23 and the valve seat 20. The ring 22 may be made of para rubber, and is easily renewed in case it wears sufficiently to make that necessary. Even in such case, however, the gasket ring 22 can be renewed at much less expense than the present types of tank balls, which require renewal quite frequently.

It will be apparent from the foregoing that I have provided a tank ball which is a distinct improvement over tank balls known to the prior art, in that the invention contemplates a ball which is not subject to the defects of the present types of float valves for toilet tanks. The invention provides a tank ball which is not subject to distortion or deformation, because the sealing wall thereof is supported internally by a self-sustaining member of greater or less rigidity. As a result, the life of the ball, in satisfactory operation, is very much increased, without a disproportionate increase in the cost of manufacture.

While I have illustrated and described but a few preferred embodiments of the invention, the latter is not to be limited to the specific elements described. Any changes in the details of the forms of the invention disclosed may be made without departing from the scope of the appended claim, and without sacrificing the advantages hereinabove set forth.

I claim:

In a tank valve, an outer, hollow sealing ball having a zone adapted to engage a valve seat, and an inner reinforcing shell, said reinforcing shell being continuous, of the same general shape as the sealing ball, and having contact therewith in a plurality of zones at least one of which substantially coincides with said sealing zone, but spaced therefrom over the remainder of its area.

PAUL C. GANNON.